United States Patent [19]
Ouellette

[11] Patent Number: 5,951,211
[45] Date of Patent: Sep. 14, 1999

[54] AIR CONVEYOR HAVING TRANSITIONAL SECTION

[75] Inventor: Joseph F. Ouellette, Glendale, Mo.

[73] Assignee: Oullette Machinery Systems, Inc., Fenton, Mo.

[21] Appl. No.: 08/876,848

[22] Filed: Jun. 16, 1997

[51] Int. Cl.$^6$ .................................................. B65G 51/02
[52] U.S. Cl. ............................................................. 406/88
[58] Field of Search ............................... 406/86, 88, 109, 406/196

[56] References Cited

U.S. PATENT DOCUMENTS 5,437,521  8/1995  Ouellette ..................................... 406/88
5,630,679  5/1997  Simkowski et al. .................. 406/88 X

FOREIGN PATENT DOCUMENTS

5-24648   2/1993  Japan ........................................ 406/88
5-221515  8/1993  Japan ........................................ 496/88

*Primary Examiner*—Andrew C. Pike
*Attorney, Agent, or Firm*—Howell & Haferkamp, L.C.

[57] ABSTRACT

An air conveyor transitional section connects an upstream air conveyor section to a downstream air conveyor section that is not collinear with the upstream air conveyor section. The air conveyor transitional section includes a pair of elongated members having opposed inner edges and upper surfaces adjacent the inner edges. The inner edges of the elongated members are laterally spaced to define a slot that extends in a downstream direction of the air conveyor. The upstream air conveyor section, the transitional section, and the downstream air conveyor section are all configured for conveying containers in the downstream direction. Each container has a neck ring with an outer diameter dimension. The inner edges of the elongated members are laterally spaced by a distance smaller than the container neck ring outer diameter dimension so that the upper surfaces provide slidable support for the container neck rings. The pair of elongated members of the transitional section has a continuous curve that extends without interruption substantially from a downstream end of the upstream air conveyor section substantially to an upstream end of the downstream air conveyor section. At least a portion of the pair of elongated members extends curvilinearly in a vertical plane so that a height of the containers varies vertically as the containers are conveyed in the downstream direction through the curvilinearly extending portion of the pair of elongated members. Thus, the transitional section defines a substantially continuous conveying path connecting the upstream and downstream air conveyor sections.

22 Claims, 6 Drawing Sheets

AIR CONVEYOR HAVING TRANSITIONAL SECTION

BACKGROUND OF THE INVENTION

The present invention relates to an air conveyor for conveying plastic bottles, and more particularly to an air conveyor which includes a curved transitional section for connecting an upstream air conveyor section to a downstream air conveyor section.

Air conveyors are useful for the rapid transport of plastic bottles between work stations as, for example, between a storage station and a bottle-filling station. Typically, the air conveyor includes a pair of elongated flanges spaced to define an elongated slot between them, and a series of air ducts or nozzles on opposite sides of the slot. The plastic bottles are formed with annular neck rings adjacent the tops of their necks. With the bottle necks extending through the slot and the neck rings overlying the spaced flanges, the bottles are suspended from the flanges and hang below the slot. Pressurized air from the air nozzles is directed in streams toward the bottles. The bottles move through the slot in a downstream direction because of the force of the air streams against the bottles.

U.S. Pat. No. 5,437,521, issued Aug. 1, 1995, and assigned to the assignee of the present invention, discloses and claims such an air conveyor. The disclosure of the '521 patent is incorporated herein by reference. Although the invention disclosed in the '521 patent was a significant improvement over the prior art, a need remains for an efficient means for smoothly connecting upstream and downstream air conveyor sections that are not collinear.

SUMMARY OF THE INVENTION

The present invention represents an improvement over the air conveyor system disclosed in the '521 patent by providing an air conveyor transitional section for connecting an upstream air conveyor section to a downstream air conveyor section that is not collinear with the upstream air conveyor section. Generally, the air conveyor transitional section of the present invention comprises a pair of elongated members having opposed inner edges and upper surfaces adjacent the inner edges. The inner edges of the elongated members are laterally spaced to define a slot that extends in a downstream direction of the air conveyor. The upstream air conveyor section, the transitional section, and the downstream air conveyor section are all configured for conveying containers in the downstream direction. Each container has a neck ring with an outer diameter dimension. The inner edges of the elongated members are laterally spaced by a distance smaller than the container neck ring outer diameter dimension so that the upper surfaces provide slidable support for the container neck rings. The pair of elongated members of the transitional section have a continuous curve that extends without interruption substantially from a downstream end of the upstream air conveyor section substantially to an upstream end of the downstream air conveyor section. Thus, the transitional section defines a substantially continuous conveying path connecting the upstream and downstream air conveyor sections.

In another aspect of the present invention, at least a portion of the pair of elongated members of the transitional section extends curvilinearly in a vertical plane so that the transitional section smoothly connects the upstream and downstream air conveyor sections. In still another aspect of the present invention, at least a portion of the pair of elongated members extends curvilinearly in a vertical plane so that a height of the containers varies vertically as the containers are conveyed in the downstream direction through the curvilinearly extending portion of the pair of elongated members.

Other objects and features will be in part apparent and in part pointed out hereinafter.

BRIEF DESCRIPTION OF THE DRAWINGS

Reference characters in the written specification indicate corresponding parts throughout the several views of the drawings.

DESCRIPTION OF THE PREFERRED EMBODIMENTS

The air conveyor transitional section of the present invention, indicated generally in FIGS. 1–4 by the reference numeral 20, is configured for use in connection with an air conveyor of the type disclosed in U.S. Pat. No. 5,437,521. The transitional section connects an upstream air conveyor section 22 to a downstream air conveyor section 24 that is not collinear with the upstream air conveyor section 22. Generally, the transitional section 20 comprises a pair of elongated flanges 30 having opposed inner edges 32 and 34 and upper surfaces 36 and 38 adjacent the inner edges 32 and 34. The inner edges 32 and 34 are laterally spaced to define a slot 40 that extends in a downstream direction of the conveyor.

Figure 1:
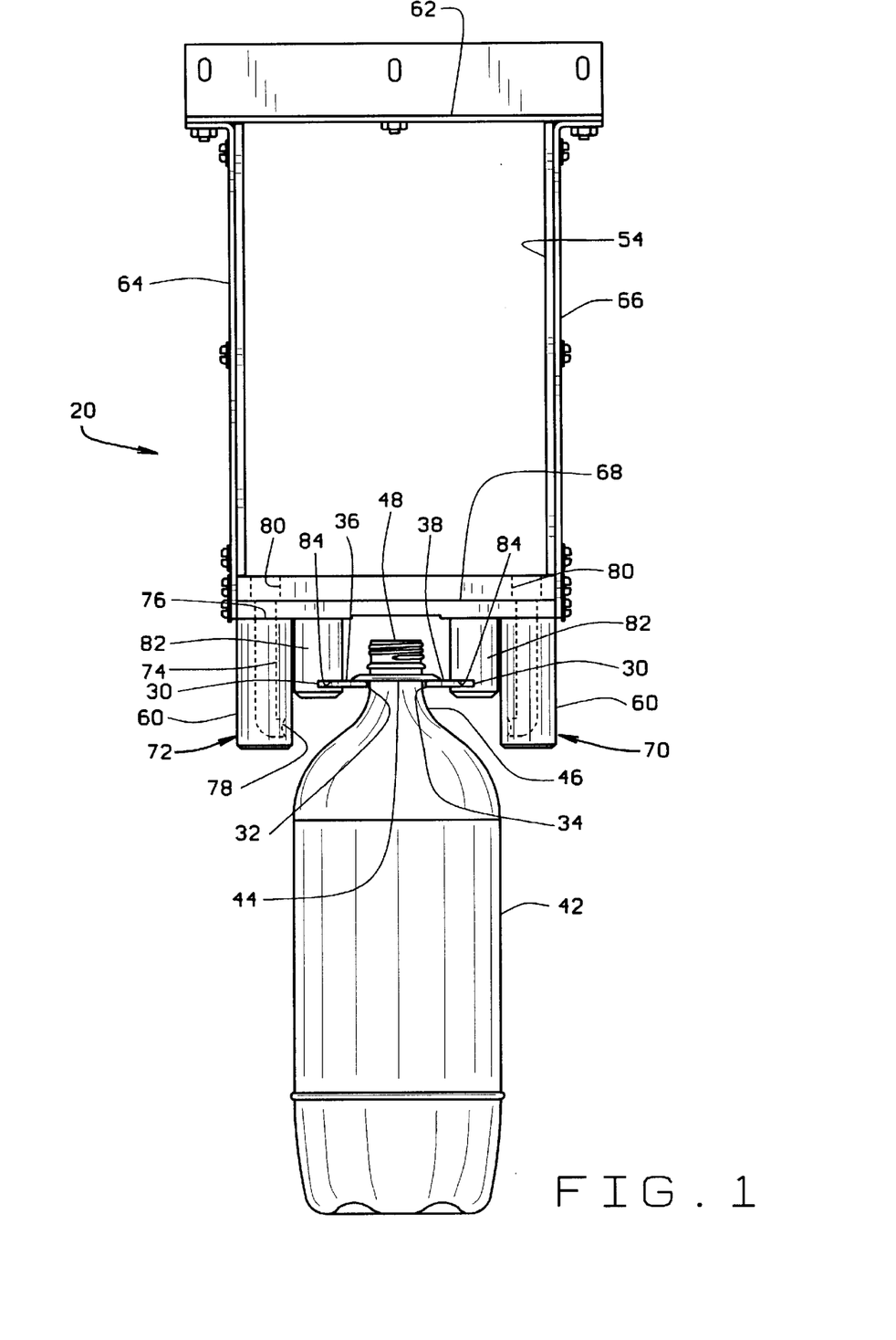
FIG. 1 is an end view of an air conveyor transitional section of the present invention shown with a plastic bottle container suspended therefrom.

The upstream air conveyor section 22, the transitional section 20, and the downstream air conveyor section 24 are all configured for conveying plastic bottle containers 42 in the downstream direction of the conveyor. FIG. 1 fully shows how the bottle containers 42 are supported for being conveyed. The bottle containers 42 are of a common type that are characterized as having an annular neck ring 44 about the upper area of the neck portion 46 and below the throat portion 48. The neck portion 46 immediately below the neck ring 44 of each bottle container 42 fits through the slot 40 in close proximity to the inner edges 32 and 34 of the pair of flanges 30. The neck ring 44 of each bottle container 42 has an outer diameter dimension that is larger than the outside diameter of the neck portion 46. The inner edges 32 and 34 of the pair of flanges 30 are laterally spaced by a distance smaller than the outer diameter dimension of the neck rings 44 so that the upper surfaces 36 and 38 provide slidable support for the neck rings 44.

Figure 2:
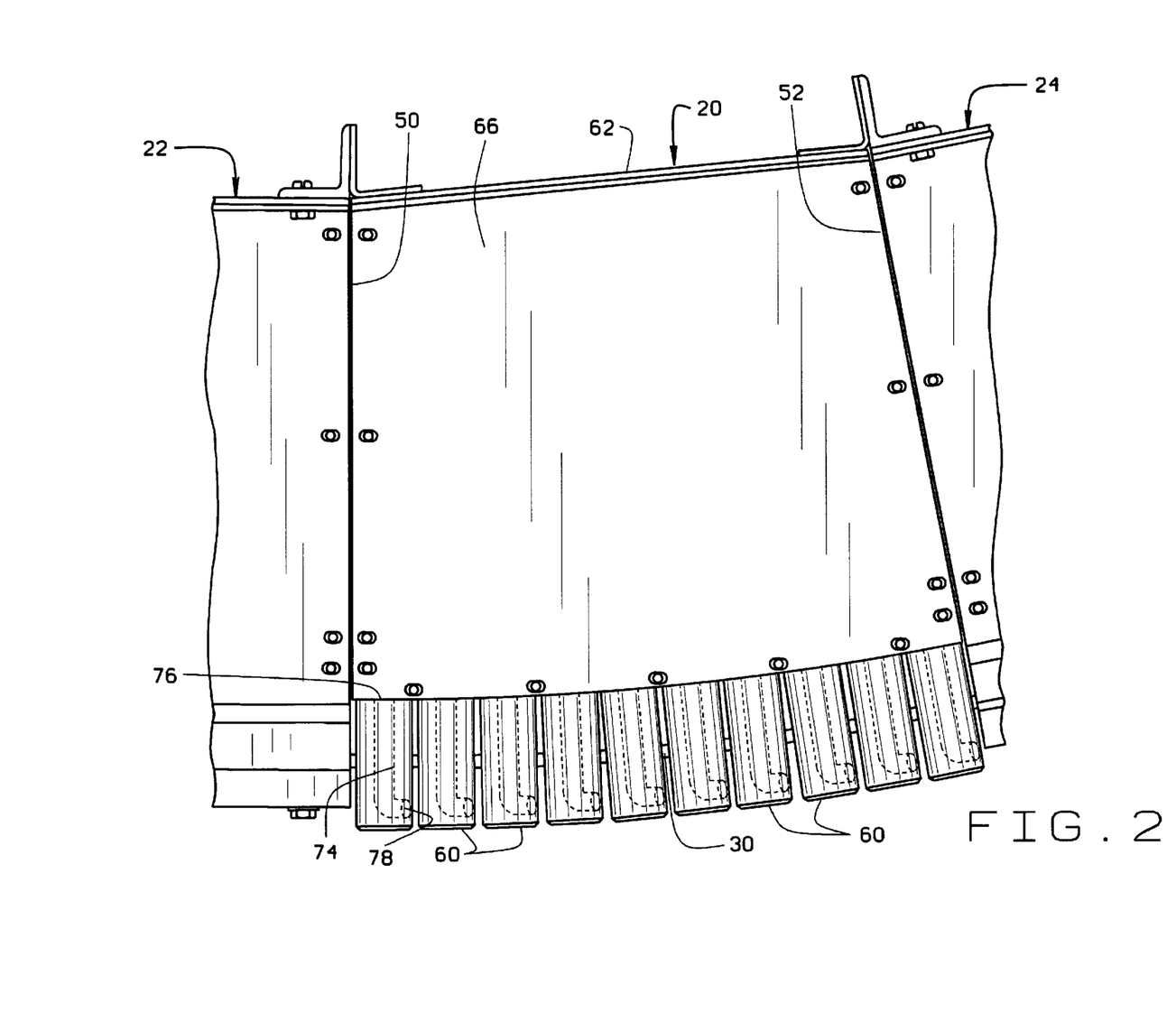
FIG. 2 is a side elevational view of an air conveyor transitional section of the present invention which extends curvilinearly to connect a horizontal upstream air conveyor section to an inclined downstream air conveyor section.
Figure 4:
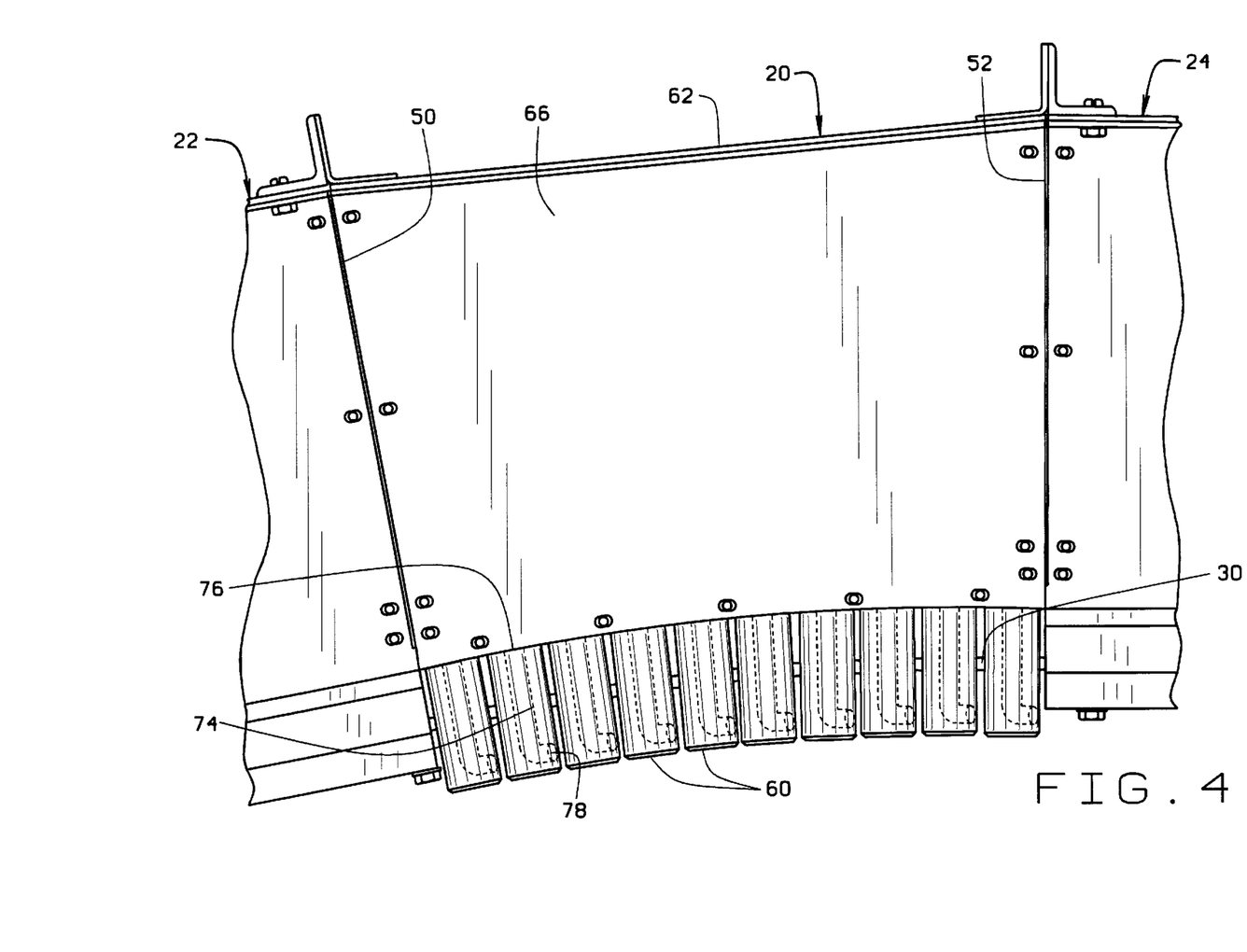
FIG. 4 is a side elevational view of an air conveyor transitional section of the present invention which extends curvilinearly to connect an inclined upstream air conveyor section to a horizontal downstream air conveyor section.

The air conveyor transitional section 20 can be as long as desired, and the drawings illustrate a representative span. As shown in FIGS. 2 and 4, at least a portion of the pair of elongated flanges 30 of the transitional section 20 extends curvilinearly in a vertical plane to thereby define a substantially continuous conveying path that smoothly connects the upstream air conveyor section 22 and the downstream air conveyor section 24. Preferably, the pair of elongated flanges 30 have a continuous curve that extends without interruption from a downstream end 50 of the upstream air conveyor section 22 to an upstream end 52 of the downstream air conveyor section 24. The pair of elongated flanges 30 of the transitional section 20 extends curvilinearly in a vertical plane so that the height of the bottle containers 42 varies vertically as the containers 42 are conveyed in the downstream direction through the transitional section 20. In FIG. 2, the pair of elongated flanges 30 of the transitional section 20 is shown with a continuous curve that extends upwardly in the downstream direction to connect a horizontal upstream air conveyor section 22 to an inclined downstream air conveyor section 24. In FIG. 4, the flanges 30 are shown with a continuous curve that extends downwardly in the downstream direction to connect an inclined upstream air conveyor section 22 to a horizontal downstream air conveyor section 24. It should be understood that, without departing from the scope of the present invention, the transitional section 20 could be constructed to connect other arrangements of upstream and downstream air conveyor sections that are not collinear with one another. Also, although the preferred embodiment of the transitional section 20 is described as including a pair of elongated flanges 30 that extends curvilinearly in a vertical plane, other embodiments could be constructed wherein the pair of elongated flanges 30 extends curvilinearly in a horizontal plane or some other angled plane.

As more fully described in the '521 patent, the basic air conducting components consist of an air supply, such as an air blower (not shown), an elongated plenum chamber 54, and a plurality of air nozzles 60. As shown in FIGS. 1 and 2, the plenum chamber 54 has a box-like construction defined by an elongate top wall 62, a pair of elongate side walls 64 and 66, and an apertured bottom wall 68. In the preferred embodiment, the top wall 62 is a flat, rectangular shaped piece of sheet metal. The two opposed side walls 64, 66 are substantially identical to each other and are also formed from sheet metal. As best seen in FIG. 2, the top edge of each side wall and the forward and rearward edges of each side wall are generally straight. The forward and rearward edges of the side walls are oriented at an angle greater than 90° relative to the top edges of the side walls. In the transitional segment of the conveyor shown in FIG. 2, this results in the bottom edges of the side walls being longer than the top edges. The side wall bottom edges shown in FIG. 2 have a curved configuration. The bottom wall 68 has a curved configuration that is complimentary to the curvature of the side wall bottom edges. The curved bottom wall 68 is secured between the bottom edges of the side walls 64, 66 by threaded fasteners or other equivalent methods. The blower can be of any standard type that is well known in the art. Its output is conducted to the plenum chamber 54 so that the plenum chamber 54 is supplied with pressurized air.

Figure 3:
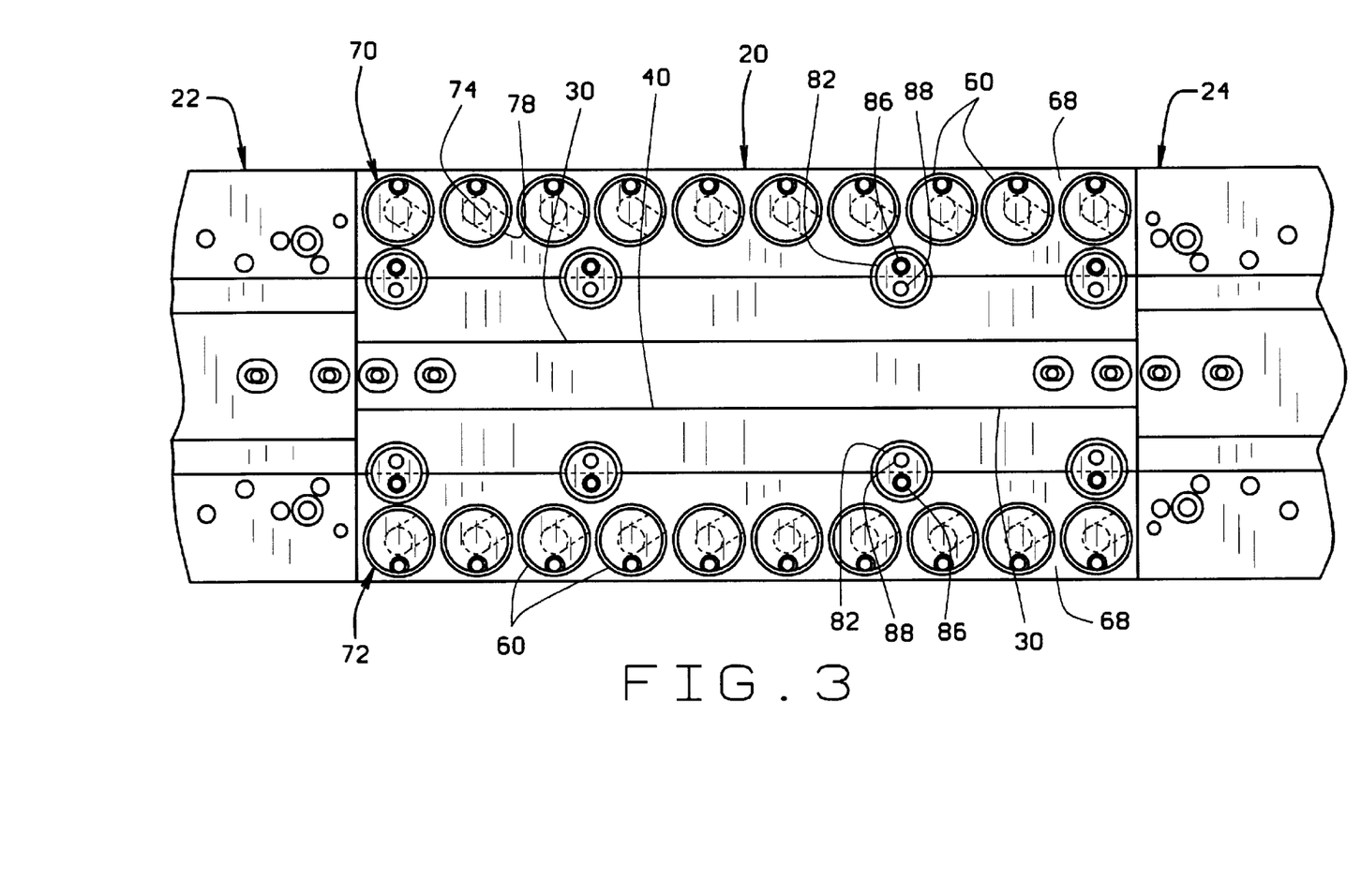
FIG. 3 is a bottom view of an air conveyor transitional section of the present invention.

The motive force that conveys the bottle containers 42 is a plurality of air streams discharged from the air nozzles 60. The air nozzles 60 are connected to the conveyor adjacent the elongated flanges 30. As shown in FIG. 3, the air nozzles 60 are preferably arranged in two longitudinal rows 70 and 72, one row on each side of the slot 40. The air nozzles 60 are configured to direct streams of air toward the bottle containers 42 being conveyed to move the containers 42 in the downstream direction. Each air nozzle 60 includes a curved conducting passage 74 connecting an air inlet opening 76 and an outlet port 78. The air inlet opening 76 of each air nozzle 60 is aligned with apertures 80 in the bottom wall 68 of the plenum chamber 54 to provide fluid communication between the plenum chamber 54 and the curved conducting passage 74.

As shown in FIGS. 1 and 3, a plurality of flange suspending posts 82 are attached to the underside of the curved bottom wall 68 just inside the rows of nozzles 70, 72. The posts 82 are spacially arranged along the length of transitional section 20. The posts 82 are preferably formed of aluminum, but may be formed of other materials. Each post has a generally cylindrical configuration and as a flange receiving slot 84 formed in the cylindrical side of each post. The slot 84 extends halfway through the post and is generally perpendicular to a center axis of the post. The slot 84 is dimensioned sufficiently large to receive a portion of one of the elongated flanges 30 therein. Referring to FIG. 3, each post has a fastener hole extending axially therethrough that is spaced from and does not intersect the post slot 84. A threaded fastener 86 extends through the fastener hole of each post and secures the post to the underside of the curved bottom wall 68 of the transitional section 20 in the position shown in FIG. 3. Adjacent each fastener hole, each post 82 also has a slot hole that extends into the post from its bottom side and intersects the flange receiving slot 84. A slot fastener 88 is threaded into each slot hole. With each of the elongated flanges 30 positioned in the slots 84 of the posts 82 positioned along the opposite sides of the bottle conveying slot 40, the slot fasteners 88 are screw threaded into their respective holes and engage against the bottom surfaces of the flanges 30, thereby securely holding the flanges in the slots 84 of the posts 82. As best seen in FIG. 1, the posts 82 hold the flanges 30 in their laterally spaced positions on opposite sides of the conveyor slot 40 between the two rows 70, 72 of the air nozzles and just above the outlet ports 78 of the air nozzles. This positions the bottle containers 42 in their optimum positions between the pluralities of air nozzles 60 where air streams ejected from the nozzles will push the bottle containers 42 along the flanges 30 in a downstream direction. Because each of the posts 82 is attached to the curved bottom wall 68 of the transitional section 20, the pair of flanges 30 suspended by the posts 82 has a curved configuration that generally follows the curved configuration of the transitional section bottom wall 68. The length of each of the posts 82 also positions the upstream and downstream ends of the pair of flanges 30 in line with the flanges of the upstream air conveyor section 22 and the downstream air conveyor section 24 so that the flow of bottles from the upstream section to the downstream section is continuous through the transitional section 20.

Figure 5:
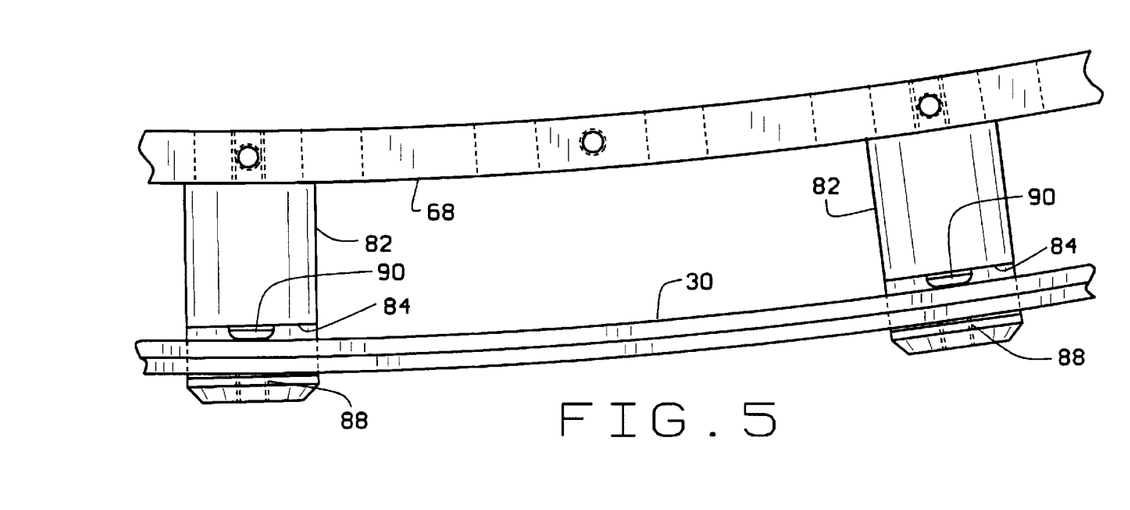
FIG. 5 is an enlarged, fragmented side elevational view of an air conveyor transitional section with an upwardly extending curve showing detail of a flange and two flange suspending posts.
Figure 6:
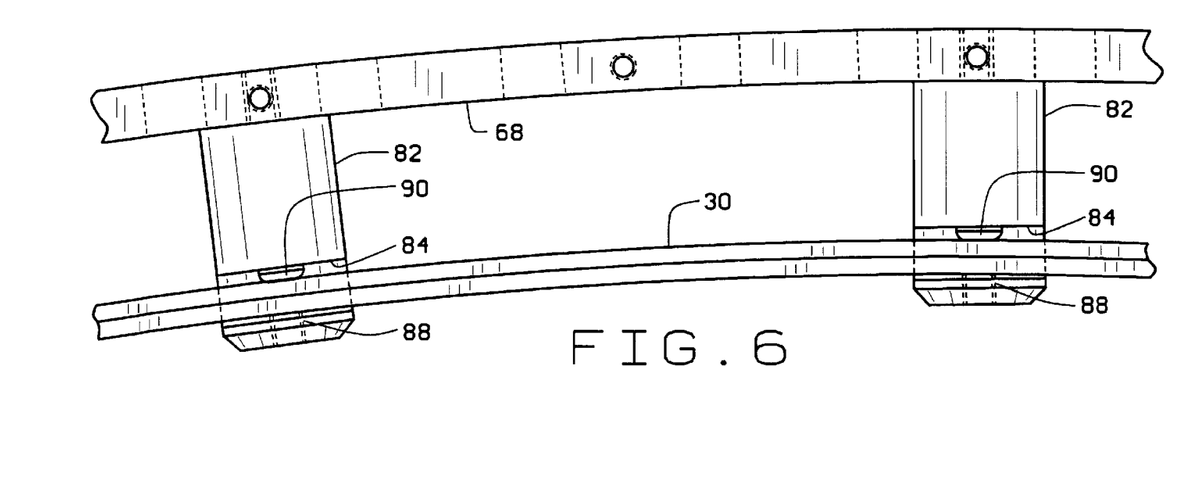
FIG. 6 is an enlarged, fragmented side elevational view of an air conveyor transitional section with a downwardly extending curve showing detail of a flange and two flange suspending posts.

FIGS. 5 and 6 are enlarged, fragmented side elevational views of the transitional section 20 showing detail of one of the elongated flanges 30 and two of the flange suspending posts 82. Each of the posts 82 preferably includes a contact button 90 on an upper interior surface of the slot 84. With the slot fasteners 88 threaded into their respective holes, the flanges 30 are held between the slot fasteners 88 and the contact buttons 90. The contact buttons 90 provide a point contact between the slot 84 and the flange 30 so that the continuous curve of the flange 30 is not distorted or interrupted with any flattened sections of the post slot interiors.

Figure 7:
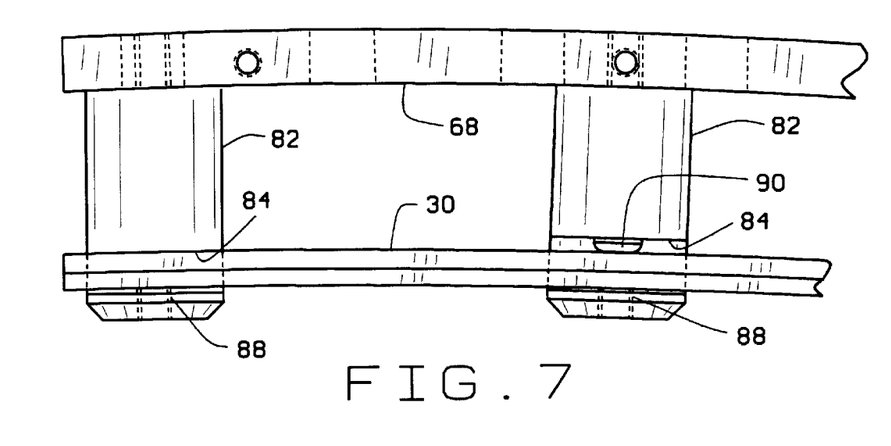
FIG. 7 is an enlarged, fragmented side elevational view of an air conveyor transitional section with a downwardly extending curve showing detail of a flange suspending post at an upstream end of the transitional section.
Figure 8:
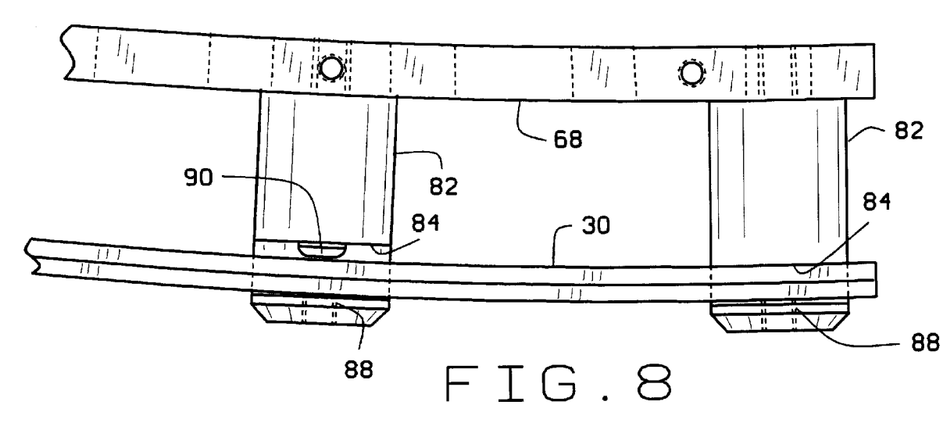
FIG. 8 is an enlarged, fragmented side elevational view of an air conveyor transitional section with an upwardly extending curve showing detail of a flange suspending post at a downstream end of the transitional section.

FIG. 7 shows detail of a suspending post 82 at the terminal upstream end of the transitional section 20 and FIG. 8 shows detail of a suspending post 82 at the terminal downstream end of the transitional section 20. Preferably, these suspending posts 82 at the terminal upstream and downstream ends of the transitional section 20 do not employ contact buttons 90. This is because, at the terminal upstream and downstream ends of the transitional section, it is desirable to have a substantially straightened lead-in section of the flanges 30 so that the flanges 30 of the transitional section 20 mate smoothly with the flanges of the upstream and downstream air conveyor sections 22 and 24. Thus, at the terminal upstream and downstream ends of the transitional section, the flanges 30 are held between the slot fasteners 88 and flat upper interior surfaces of the slots 84. The flat upper interior surfaces serve to straighten portions of the flanges 30 in the proximity of the posts 82. Since no contact buttons are used with the suspending posts 82 at the terminal upstream and downstream ends of the transitional section 20, the slots may be narrower than the slots of posts situated along interior portions of the transitional section 20.

The transitional section 20 of the air conveyor shown in FIG. 2 communicates a horizontal upstream section 22 with an upwardly inclined downstream section 24 of the air conveyor system. The transitional section 20 shown in FIG. 4 communicates an inclined upstream air conveyor section 22 to a horizontal downstream air conveyor section 24. It can be seen that the basic differences between the transitional section shown in FIG. 2 and FIG. 4 are in the opposite curvatures of the bottom wall 68 and flanges 30 of these two sections. The air nozzles, the flange receiving posts and the flanges of the FIG. 4 embodiment are connected to the transitional section in substantially the same way as that described with reference to FIG. 2 and function in substantially the same way as that described with reference to FIG. 2.

In operation, pressurized air is supplied by the blower to the plenum chamber 54 for manifold distribution through the curved conducting passages 74 of the air nozzles 60. One row 70 of the nozzles 60 is on one side of the slot 40, and the other row 72 is on the other side of the slot 40. As more fully described in the '521 patent, the air nozzles 60 discharge air from the outlet ports 78 in streams that are inward, forward, and downward. The sum effect of these air stream components upon the bottle containers 42 is to convey the bottle containers 42 through the slot 40 in the downstream direction.

At least some of the air nozzles 60 are positioned on opposite sides of the curvilinearly extending portion of the pair of elongated flanges 30 of the transitional section 20. Preferably, the air nozzles 60 are arranged so that each bottle container 42, while moving through the curvilinearly extending portion of the pair of elongated flanges 30, is generally always in the path of at least one of the streams of air. More preferably, the air nozzles 60 of the two rows 70 and 72 are arranged so that each bottle container 42 is generally always in the path of at least one of the streams of air on each side of the bottle 42 container while moving through the curvilinearly extending portion of the pair of elongated flanges 30.

Therefore, the present invention represents an improvement over the prior art by providing an air conveyor transitional section 20 which smoothly connects an upstream air conveyor section 22 and a downstream air conveyor section 24 that are not collinear with one another. As various changes could be made in the above constructions without departing from the scope of the invention, it is intended that all matter contained in the above description or shown in the accompanying drawings shall be interpreted as illustrative and not in a limiting sense. It should be understood that other configurations of the present invention could be constructed, and different uses could be made, without departing from the scope of the invention as set forth in the following claims.

What is claimed is:

1. An air conveyor transitional section for connecting an upstream air conveyor section to a downstream air conveyor section that is not collinear with the upstream air conveyor section, the upstream air conveyor section, the transitional section, and the downstream air conveyor section all being configured for conveying containers in a downstream direction, each container having a neck ring with an outer diameter dimension, the transitional section comprising a pair of elongated members having opposed inner edges and upper surfaces adjacent the inner edges, the inner edges being laterally spaced to define a slot that extends in the downstream direction, the inner edges being laterally spaced by a distance smaller than the container neck ring outer diameter dimension so that the upper surfaces provide slidable support for the container neck rings, the pair of elongated members of the transitional section having a continuous curve that extends without interruption substantially from a downstream end of the upstream air conveyor section substantially to an upstream end of the downstream air conveyor section to thereby define a substantially continuous conveying path connecting the upstream and downstream air conveyor sections;

the air conveyor transitional section further comprising a plurality of air nozzles adjacent to the elongated members, the plurality of air nozzles being configured to direct streams of air in paths toward body portions of the containers below the elongated members as the containers are being conveyed through the transitional section to move the containers in the downstream direction.

2. The air conveyor transitional section of claim 1 wherein the pair of elongated members of the transitional section extends curvilinearly in a vertical plane so that a height of the containers varies vertically as the containers are conveyed in the downstream direction through the transitional section.

3. The air conveyor transitional section of claim 2 wherein the continuous curve of the pair of elongated members extends upwardly as the elongated members extend in the downstream direction.

4. The air conveyor transitional section of claim 2 wherein the continuous curve of the pair of elongated members extends downwardly as the elongated members extend in the downstream direction.

5. The air conveyor transitional section of claim 1 wherein the plurality of air nozzles are arranged so that each container, while moving through the transitional section, is generally always in the path of at least one of the streams of air.

6. The air conveyor transitional section of claim 1 wherein the plurality of air nozzles are arranged in two longitudinal rows, one row being on each side of the slot.

7. The air conveyor transitional section of claim 6 wherein the plurality of air nozzles are arranged so that each container, while moving through the transitional section, is generally always in the path of at least one of the streams of air on each side of the container.

8. The air conveyor transitional section of claim 1 further comprising a plurality of suspending members spaced along a length of the transitional section, each of the suspending members having a slot configured for receiving a portion of one of the elongated members.

9. The air conveyor transitional section of claim 8 wherein each slot has a slot interior surface and a projection which protrudes from the slot interior surface thereof, the projection of each slot being configured to engage against the one of the elongated members held in the slots in a manner to securely hold the one of the elongated members in the slots without interrupting a continuity of the continuous curve of the elongated members.

10. An air conveyor configured for conveying containers in a downstream direction, wherein each container has a neck ring with an outer diameter dimension, the air conveyor comprising: an upstream air conveyor section;

a downstream air conveyor section that is not collinear with the upstream air conveyor section; and a transitional section configured for connecting the upstream air conveyor section to the downstream air conveyor section, the transitional section including a pair of elongated members having opposed inner edges and upper surfaces adjacent the inner edges, the inner edges being laterally spaced to define a slot that extends in the downstream direction, the inner edges being laterally spaced by a distance smaller than the container neck ring outer diameter dimension so that the upper surfaces provide slidable support for the container neck rings, at least a portion of the pair of elongated members of the transitional section extending curvilinearly in a vertical plane, an upstream end of the transitional section being connected to the upstream air conveyor section and a downstream end of the transitional section being connected to the downstream air conveyor section to thereby define a substantially continuous conveying path that smoothly connects the upstream and downstream air conveyor sections;

the transitional section further comprising a plurality of air nozzles adjacent to the elongated members, the plurality of air nozzles being configured to direct streams of air in paths toward body portions of the containers below the curvilinearly extending portion of the elongated members as the containers are being conveyed through the transitional section to move the containers in the downstream direction.

11. The air conveyor of claim 10 wherein the curvilinearly extending portion of the pair of elongated members extends substantially from the upstream end of the transitional section substantially to the downstream end of the transitional section.

12. The air conveyor of claim 10 wherein the curvilinearly extending portion of the pair of elongated members extends upwardly as the elongated members extend in the downstream direction.

13. The air conveyor of claim 10 wherein the curvilinearly extending portion of the pair of elongated members extends downwardly as the elongated members extend in the downstream direction.

14. The air conveyor of claim 10 wherein the plurality of air nozzles are arranged so that each container, while moving through the transitional section, is generally always in the path of at least one of the streams of air.

15. An air conveyor for conveying containers in a downstream direction of the conveyor, each container having a neck ring with an outer diameter dimension, the conveyor comprising a pair of elongated members having opposed inner edges and upper surfaces adjacent the inner edges, the inner edges being laterally spaced to define a slot that extends in the downstream direction, the inner edges being laterally spaced by a distance smaller than the container neck ring outer diameter dimension so that the upper surfaces provide slidable support for the container neck rings, at least a portion of the pair of elongated members extending curvilinearly in a vertical plane so that a height of the containers varies vertically as the containers are conveyed in the downstream direction through the curvilinearly extending portion of the pair of elongated members the air conveyor further comprising a plurality of air nozzles adjacent to the curvilinearly extending portion of the elongated members, the plurality of air nozzles being configured to direct streams of air in paths toward body portions of the containers below the curvilinearly extending portion of the elongated members as the containers are being conveyed through the curvilinearly extending portion to move the containers in the downstream direction.

16. The air conveyor of claim 15 wherein the curvilinearly extending portion of the pair of elongated members extends upwardly as the elongated members extend in the downstream direction.

17. The air conveyor of claim 15 wherein the curvilinearly extending portion of the pair of elongated members extends downwardly as the elongated members extend in the downstream direction.

18. The air conveyor of claim 15 wherein the plurality of air nozzles are arranged in two longitudinal rows, one row being on each side of the slot.

19. The air conveyor of claim 15 wherein a number of the plurality of air nozzles are connected to the curvilinearly extending portion of the pair of elongated members.

20. The air conveyor of claim 19 wherein a number of the plurality of air nozzles are arranged so that each container, while moving through the curvilinearly extending portion of the pair of elongated members, is generally always in the path of at least one of the streams of air.

21. The air conveyor of claim 15 further comprising a plurality of suspending members spaced along a length of the transitional section, each of the suspending members having a slot configured for receiving a portion of one of the elongated members.

22. The air conveyor of claim 21 wherein each slot has a slot interior surface and a projection which protrudes from the slot interior surface thereof, the projection of each slot being configured to engage against the one of the elongated members held in the slots in a manner to securely hold the one of the elongated members in the slots without interrupting a continuity of the curvilinearly extending portion of the elongated members.

* * * * *